(12) United States Patent
Vollmer et al.

(10) Patent No.: US 7,127,349 B2
(45) Date of Patent: Oct. 24, 2006

(54) METHOD FOR OPERATING A NAVIGATION SYSTEM OF A VEHICLE, ESPECIALLY A MOTOR VEHICLE, AND CORRESPONDING NAVIGATION SYSTEM

(75) Inventors: Vasco Vollmer, Holle (DE); Arne Friedrichs, Braunschweig (DE); Gerd Draeger, Braunschweig (DE)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 10/482,455

(22) PCT Filed: Apr. 6, 2002

(86) PCT No.: PCT/DE02/01262

§ 371 (c)(1),
(2), (4) Date: Jun. 15, 2004

(87) PCT Pub. No.: WO03/004971

PCT Pub. Date: Jan. 16, 2003

(65) Prior Publication Data

US 2004/0249570 A1    Dec. 9, 2004

(30) Foreign Application Priority Data

Jun. 30, 2001  (DE) .............................. 101 31 800.6

(51) Int. Cl.
*G01C 21/34* (2006.01)
(52) U.S. Cl. ....................................................... 701/211
(58) Field of Classification Search ................ 701/211; 340/995
See application file for complete search history.

(56) References Cited

U.S. PATENT DOCUMENTS

| 6,202,024 B1 | 3/2001 | Yokoyama et al. |
| 6,456,932 B1 * | 9/2002 | Yagyu .......................... 701/209 |
| 6,636,805 B1 * | 10/2003 | Tada et al. ................... 701/209 |
| 6,680,674 B1 * | 1/2004 | Park ............................ 340/905 |

FOREIGN PATENT DOCUMENTS

EP    0 629 840    12/1994

* cited by examiner

*Primary Examiner*—Thu V. Nguyen
(74) *Attorney, Agent, or Firm*—Kenyon & Kenyon LLP

(57) ABSTRACT

A method for operating a navigation system and a navigation system for a vehicle, a motor vehicle in particular, data concerning geographic positions of the vehicle being determined by a position-finding system and transmitted to an electronic data processing device having access to a database and a digital road map. Based on this data, the location of the vehicle on the digital road map is determined and route guidance instructions are output to the driver of the vehicle acoustically and/or visually. Also, information from the navigation system may be used for traveling routes selected by the driver himself before the start of the trip and to which the navigation system does not output any route guidance instructions. Routes selected by the driver himself are entered into the navigation system and stored by a route memory of the navigation system.

13 Claims, 1 Drawing Sheet

METHOD FOR OPERATING A NAVIGATION SYSTEM OF A VEHICLE, ESPECIALLY A MOTOR VEHICLE, AND CORRESPONDING NAVIGATION SYSTEM

FIELD OF THE INVENTION

The present invention relates to a method for operating a navigation system and a navigation system for a vehicle, a motor vehicle in particular, data concerning the geographic position of a vehicle being determined by a position-finding system and transmitted to an electronic data processing device having access to a database and a digital road map, and the position of the vehicle on the digital road map being determined based on this data and route guidance instructions being output to the driver of the vehicle acoustically and/or visually.

BACKGROUND INFORMATION

Navigation systems for vehicles, motor vehicles in particular, and methods for operating such navigation systems are available. They are used to determine the instantaneous geographic position of the vehicle and, as a function of a specifiable destination to be reached, to calculate the most favorable itinerary and to give the driver instructions concerning the itinerary.

Such navigation systems require information, which is necessary to determine the instantaneous position of the vehicle and calculate the itinerary. In particular, this includes road routing, turning conditions, and the like. This data is provided in the form of a database. To this end, the database includes, for example, a digital road map containing landmarks and/or decision-making points of the possible routes. Providing the database in on-board mass storage devices, a CD-ROM, for example, is available.

Furthermore, a position-finding system that determines the instantaneous geographic position of the vehicle is necessary. The satellite-supported global position-finding system (GPS), for example, is available for this purpose.

An electronic data processing device compares the position data delivered by the position-finding system with the data stored in the digital road map and determines the instantaneous position of the vehicle. Corresponding to the selected destination, the electronic data processing device may provide route guidance information to the driver visually and/or acoustically on a selected most favorable itinerary using landmarks and/or decision-making points.

To perform the functions indicated, such navigation systems may be made up of functionally interconnected subsystems. Such individual subsystems include systems such as an electronic data processing device, position-finding system, digital road map, vehicle sensor system, communication module, obstacle calculation device, itinerary determination device, route guidance device, input unit, and output unit.

A disadvantage with such navigation systems and with available methods for operating navigation systems may be that if the driver allows himself to be guided by the navigation system, he may need to exclusively travel the route that is calculated by the navigation system and output to him as a route guidance instruction. If, according to his own discretion, the driver chooses another route to travel, which deviates from the route specified by the navigation system, he may not reasonably use the information from the navigation system because such navigation systems are not believed to be designed for this purpose. Therefore, the driver may not select a route for a segment familiar to him, which he has chosen based on personal criteria relating to length of time, traffic load, efficiency or preference, or use the navigation system when traveling this route.

For example, the driver may like to select a different route than the one calculated by the navigation system for the way from his home to his workplace and back. For this purpose also, certain information from the navigation system could be useful to him. Even if route guidance instructions are not necessary for this route because the driver knows it perfectly, he is still interested in obtaining timely information concerning the traffic situation in order to be able to travel another route if necessary if, for example, a traffic jam exists in the stretch of road still ahead of him in the route originally planned. However, the present methods for operating navigation systems and corresponding navigation systems may not allow the navigation system to output information concerning the traffic situation when traveling a route selected by the driver himself, which is not provided in the navigation system.

SUMMARY OF THE INVENTION

An object of the exemplary embodiment and/or method of the present invention is to devise a method for operating a navigation system for a vehicle as well as a navigation system according to the definition of the species, in which information from the navigation system is also usable for traveling routes that are selected by the driver himself before starting the trip and for which the navigation system does not output any route guidance instructions.

The fact that routes selected by the driver himself are entered into the navigation system and stored by a route memory of the navigation system allows for traveling a route that the driver has selected himself and to utilize information from the navigation system in doing so. The route selected by the driver himself may be advantageously stored by a route memory of the navigation system. The exemplary embodiment and/or method of the present invention allows the driver to select a route for a segment familiar to him, which was chosen based on personal criteria relating to length of time, traffic load, efficiency, or preference. Nonetheless, the module for recognizing and if necessary, circumventing, traffic jams is utilized advantageously. The driver receives up-to-date traffic information, which is valid for the route he has selected without having to use the conventional route guidance. Another advantage is that the driver is not distracted during the trip by route guidance information relating to another route. As a result, the driver is able to concentrate entirely on the road traffic. The exemplary embodiment and/or method of the present invention may thus advantageously contributes to traffic safety.

An exemplary embodiment of the present invention provides that when starting out on trips, the routes selected by the driver himself are recorded and stored by the route memory of the navigation system. This allows for the route selected by the driver himself to be defined precisely and stored in a simple and advantageous manner.

Another exemplary embodiment of the present invention provides that the monitoring mode of the navigation system may be activated optionally for the stored route.

Another exemplary embodiment of the present invention provides that the navigation system automatically detects if the driver is on one of the stored routes that he selected himself.

Furthermore, an exemplary embodiment of the present invention provides that when activating the monitoring mode, the driver indicates to the navigation system that he is on one of the stored routes that he selected himself.

Another exemplary embodiment of the present invention provides that after the monitoring mode of the navigation system is activated when traveling a route which is stored in the route memory and which was selected by the driver himself, the navigation system does not output any driving instructions.

Moreover, an exemplary embodiment of the present invention provides that after the monitoring mode of the navigation system is activated when traveling a route which is stored in the route memory and which was selected by the driver himself, the monitoring module is active for the reception of traffic reports and the route segments ahead of the vehicle are monitored for traffic jams based on incoming reports.

Finally, an exemplary embodiment of the present invention provides that as soon as a traffic jam on the route is reported, the driver is informed of it.

An object according to the exemplary embodiment and/or method of the present invention is achieved by a navigation system of the aforementioned type having the features specified in claim 14. The provision of a route memory integrated in the navigation system, the routes selected by the driver himself may be stored, creates a navigation system that has a simple structure and is flexibly applicable to different routes. This may allow for the utilization of the navigation system for traveling routes that are selected by the driver himself before starting the trip.

BRIEF DESCRIPTION OF THE DRAWING

The FIG. 1 shows a block diagram of the exemplary navigation system of the present invention.

DETAILED DESCRIPTION

Figure 1:
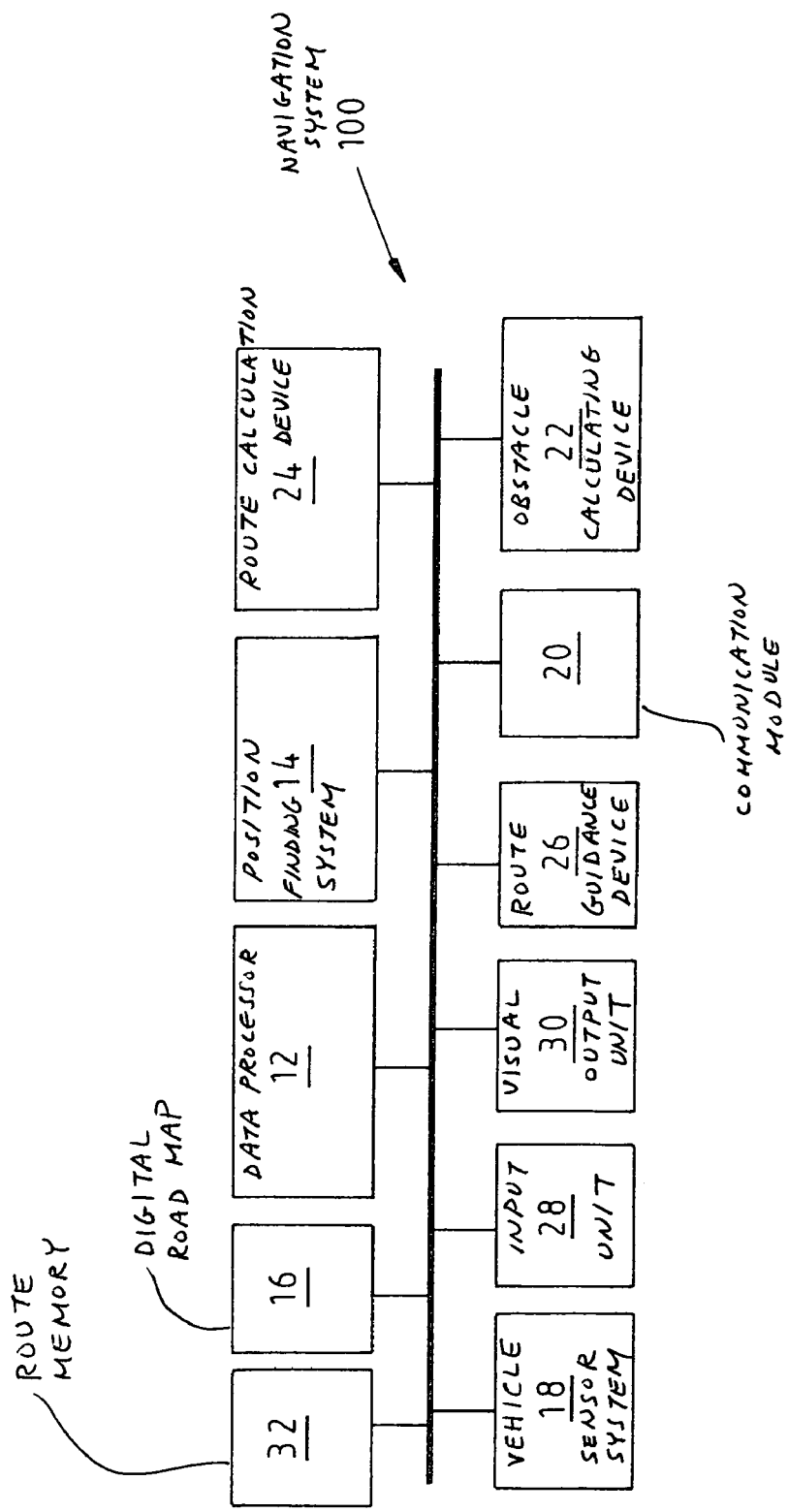

The figure schematically shows a navigation system for a motor vehicle identified in its entirety as 100. Navigation system 100 includes a device 12 for electronic data processing, which may have microprocessors, memory elements or the like, which are not shown in detail. Furthermore, navigation system 100 includes a position-finding system 14, for example, a global position-finding system (GPS), which is known per se. A mass storage, for example, a CD-ROM, and a receiving device are optionally assigned to device 12.

In addition, navigation system 100 includes a digital road map 16, a vehicle sensor system 18, a communication module 20 for the reception of current traffic information and devices for calculating obstacles 22, for route calculation 24 and for route guidance 26. Furthermore, navigation system 100 includes an input unit 28 for operating navigation system 100 as well as a visual output unit 30, a display or the like, for example, and/or an acoustic output unit 30, a speaker or the like, for example. A route memory 32 in which the routes selected by the driver himself may be stored is additionally integrated in navigation system 100.

In addition to the known route guidance, navigation system 100 is able to record a route for a segment freely selected by the driver. To this end, route memory 32 of navigation system 100 advantageously records and stores a stretch of road traveled by the vehicle. The driver is then able to activate the monitoring mode for this stored route at a later time at his discretion.

Another exemplary embodiment of the present invention provides that navigation system 100 is able to detect automatically if the vehicle is on one of the stored routes that the driver selected himself.

Navigation system 100 described schematically with reference to the figure is operated according to the exemplary method of the present invention described below.

The exemplary method of the present invention will be explained with reference to two exemplary embodiments.

In the first exemplary embodiment, it may be assumed that a driver is on the daily trip from his home to his workplace. The vehicle in which the driver travels to his workplace is equipped with navigation system 100. Based on empirical values, which he has obtained from the traffic conditions occurring at this time, he travels the same route every day. Due to his knowledge of the locale, the driver does not resort to route guidance by navigation system 100. Because navigation system 100 is equipped with route memory 32 in addition to the dynamic route guidance known per se, the driver is advantageously able to record the route he has selected using navigation system 100. To this end, it is only necessary to record the way to work one time, the route traveled being stored by route memory 32 of navigation system 100. When on his way to work, the driver is now able to switch on the monitoring mode at the start of the trip. After that, navigation system 100 receives all traffic information and advantageously filters out the information that is relevant to the segment of the stored route that is still ahead of the vehicle.

The driver travels a part of his way to work on the expressway. The driver does not know his way around on the secondary roads that run parallel to the expressway. As soon as congestion has developed on a section of the expressway of the segment of road still to be traveled, navigation system 100 receives a corresponding traffic message via communication module 20. Navigation system 100 then emits a warning and suggests an alternate route, which leaves the expressway at the next exit and continues via the secondary road. The driver is now able to decide whether to follow the suggestion. If he does make this decision, navigation system 100 safely guides him to his destination on the alternate route.

In the second exemplary embodiment, it may be assumed that a driver is on the return trip from his workplace to his home. At the start of the trip, the driver has activated the monitoring mode of navigation system 100. During the trip, the driver changes his plans and selects a different destination. Navigation system 100 detects the departure from the route and asks if the driver desires route guidance to his original destination. The driver answers in the negative. Based on the segments of road previously traveled, navigation system 100 determines a probable destination sector, i.e., starting from the instantaneous position of the vehicle, as narrow an area as possible in which the assumed destination is located. Navigation system 100 then analyzes the traffic information for this sector and presents it to the driver if needed.

What is claimed is:

1. A method for operating a navigation system for a vehicle, the method comprising:
   determining data concerning geographic positions of the vehicle by a position-finding system;
   transmitting the data to an electronic data processing device having access to a database and a digital road map;
   determining a position of the vehicle on the digital road map based on the data; and
   providing route guidance instructions to a driver of the vehicle at least one of acoustically and visually;
   wherein at least one route selected by the driver is entered into the navigation system and stored at its route memory, wherein a monitoring mode of the navigation system is activatable optionally for the at least one route selected by the driver and stored, whereby traffic information relevant to the at least one route is monitored, and wherein, when activating the monitoring mode, the driver indicates to the navigation system that the vehicle is on the at least one route selected by the driver and stored.

2. The method of claim 1, wherein, when starting out on trips, routes selected by the driver are recorded and stored by the route memory of the navigation system.

3. The method of claim 1, wherein the navigation system detects automatically if the vehicle is on one of stored routes selected by the driver.

4. The method of claim 1, wherein, after the monitoring mode of the navigation system is activated when traveling a route stored in the route memory that was selected by the driver, the navigation system does not output any driving instructions.

5. The method of claim 1, wherein, after the monitoring mode of the navigation system is activated when traveling a route stored in the route memory that was selected by the driver, the monitoring module is active to receive traffic reports, and route segments ahead of the vehicle are monitored for traffic jams based on received traffic reports.

6. The method of claim 5, wherein the driver is informed about a traffic jam on the route when it is reported.

7. The method of claim 5, wherein the navigation system determines an alternate route one of (i) upon a request of the driver and (ii) automatically, and guides the driver via the alternate route.

8. The method of claim 1, wherein the navigation system continuously determines an instantaneous position of the vehicle and compares it with a stored route.

9. The method of claim 8, wherein, as soon as the vehicle departs from a predefined route, the navigation system automatically determines a new route to the destination, and one of the following is satisfied: (i) a route guidance is performed; and (ii) the driver is requested to define a new destination.

10. The method of claim 8, wherein, as soon as the vehicle departs from a predefined route, the navigation system automatically determines a sector for which traffic reports are then monitored and the driver is given corresponding information.

11. The method of claim 1, wherein the route selected by the driver is determined on a PC and is entered into the navigation system via a download and stored by the route memory.

12. A navigation system for a vehicle, comprising:

an electronic data processing device which has access to a database having a digital road map;

a position-finding system;

a vehicle sensor system for detecting vehicle movements;

a communication module for receiving traffic information;

an input unit for operating the navigation system;

at least one output unit for providing at least one of an acoustic and a visual route guidance instruction; and a route memory, which is integrated in the navigation system, provides for storing routes selected by the driver;

wherein a monitoring mode of the navigation system is activatable optionally for the at least one route selected by the driver and stored, whereby traffic information relevant to the at least one route is monitored, and wherein, when activating the monitoring mode, the driver indicates to the navigation system that the vehicle is on the at least one route selected by the driver and stored.

13. The navigation system of claim 12, wherein a monitoring mode of the navigation system is activatable optionally for a stored route.

* * * * *